(12) United States Patent
McClellan

(10) Patent No.: US 12,484,602 B2
(45) Date of Patent: Dec. 2, 2025

(54) CONTINUOUS FLOW POPPER

(71) Applicant: Nate McClellan, La Center, WA (US)

(72) Inventor: Nate McClellan, La Center, WA (US)

(73) Assignee: NATURE NATE'S LLC, La Center, WA (US)

(*) Notice: Subject to any disclaimer, the term of this patent is extended or adjusted under 35 U.S.C. 154(b) by 817 days.

(21) Appl. No.: 17/829,718

(22) Filed: Jun. 1, 2022

(65) Prior Publication Data

US 2022/0378070 A1   Dec. 1, 2022

Related U.S. Application Data

(60) Provisional application No. 63/195,560, filed on Jun. 1, 2021.

(51) Int. Cl.
*A23L 7/183* (2016.01)

(52) U.S. Cl.
CPC ........... *A23L 7/183* (2016.08); *A23V 2002/00* (2013.01)

(58) Field of Classification Search
CPC ........................... A23V 2002/00; A23L 7/183
USPC ............................................. 99/323.9, 323.7
See application file for complete search history.

(56) References Cited

U.S. PATENT DOCUMENTS

| | | | | |
|---|---|---|---|---|
| 1,104,990 A * | 7/1914 | Harding | ................... | A23L 7/183 426/450 |
| 1,251,291 A * | 12/1917 | Scheeffer | ................ | A23L 7/187 99/337 |
| 3,512,989 A * | 5/1970 | Smith | ...................... | A23L 7/183 118/18 |
| 3,568,782 A * | 3/1971 | Cox | ........................ | E21B 21/003 507/104 |
| 3,650,199 A * | 3/1972 | Sachnik | .................. | A23P 30/38 99/518 |
| 3,751,267 A * | 8/1973 | Sachnik | .................. | F26B 17/10 426/520 |
| 3,868,469 A * | 2/1975 | Chalin | ...................... | A23G 1/02 426/465 |
| 4,091,721 A * | 5/1978 | Cosmi | ................... | A01J 25/008 99/453 |
| 4,094,633 A * | 6/1978 | Peterson | ................. | A23N 12/10 432/118 |
| 4,206,695 A | 6/1980 | Cretors | | |
| 4,238,997 A * | 12/1980 | Hengstenberg | ........ | A23N 12/04 99/348 |
| 4,288,686 A | 9/1981 | Cretors | | |
| 4,304,177 A * | 12/1981 | Loeffler | ................ | A47J 37/047 366/148 |
| 4,410,553 A * | 10/1983 | McGinty | ............... | A47J 37/047 426/243 |
| 4,664,923 A * | 5/1987 | Wagner | ..................... | A21B 1/48 426/523 |
| 4,865,864 A * | 9/1989 | Rijswijck | .............. | F24C 15/322 219/400 |
| 5,069,923 A * | 12/1991 | Hubbard | .................. | A23L 25/20 426/456 |
| 5,134,927 A * | 8/1992 | McCarthy, III | ..... | G07F 17/0085 219/400 |
| 5,193,444 A * | 3/1993 | Bar-Sheshet | ............ | A21B 1/26 99/450 |

(Continued)

*Primary Examiner* — Jimmy Chou
(74) *Attorney, Agent, or Firm* — Miller Nash LLP

(57) ABSTRACT

A continuous flow popper to pop grain that can load grain and oil into a heating chamber, move the grain through the heating chamber to an outlet, and control the heat, all automatically.

19 Claims, 3 Drawing Sheets

(56) References Cited

U.S. PATENT DOCUMENTS

| | | | |
|---|---|---|---|
| 5,301,601 A | 4/1994 | Cretors | |
| 5,397,219 A | 3/1995 | Cretors | |
| 5,419,239 A * | 5/1995 | Covington | A47J 36/38 |
| | | | 219/400 |
| 5,662,024 A | 9/1997 | Cretors et al. | |
| 6,123,011 A | 9/2000 | Cretors | |
| 6,331,323 B1 * | 12/2001 | Adler-Nissen | A47J 37/1228 |
| | | | 426/523 |
| 6,382,087 B1 * | 5/2002 | Liyama | A23N 12/10 |
| | | | 34/594 |
| 6,578,468 B1 * | 6/2003 | Horn | B01F 27/1143 |
| | | | 366/144 |
| 6,872,923 B2 | 3/2005 | Cretors et al. | |
| 7,641,460 B2 | 1/2010 | Cretors et al. | |
| 7,658,143 B2 | 2/2010 | Cretors | |
| 8,201,492 B2 * | 6/2012 | Cretors | A23L 7/187 |
| | | | 99/323.9 |
| 8,436,281 B2 | 5/2013 | Cretors | |
| 8,464,634 B2 | 6/2013 | Cretors et al. | |
| 8,637,792 B2 * | 1/2014 | Agnello | A21B 1/48 |
| | | | 219/400 |
| 8,654,014 B2 | 2/2014 | Vidojevic et al. | |
| 8,794,129 B2 * | 8/2014 | Cretors | A23P 30/38 |
| | | | 99/323.5 |
| 8,828,468 B2 | 9/2014 | Cretors | |
| 9,144,247 B2 | 9/2015 | Cretors | |
| 9,408,496 B2 | 8/2016 | Cretors | |
| D802,982 S | 11/2017 | Vidojevic | |
| 9,943,087 B2 | 4/2018 | Cretors | |
| 10,631,562 B2 * | 4/2020 | Cretors | A23L 7/161 |
| 10,631,563 B2 | 4/2020 | Cretors | |
| 10,779,558 B2 | 9/2020 | Vidojevic | |
| 11,044,929 B2 * | 6/2021 | Cretors | A23L 5/17 |
| 11,291,227 B2 | 4/2022 | Vidojevic | |
| 2001/0022178 A1 * | 9/2001 | Knost | A21B 1/26 |
| | | | 432/175 |
| 2009/0041915 A1 * | 2/2009 | Biechteler | A23L 7/183 |
| | | | 426/450 |
| 2009/0056558 A1 | 3/2009 | Cretors et al. | |
| 2009/0126579 A1 * | 5/2009 | Cretors | A23L 7/161 |
| | | | 99/323.11 |
| 2009/0208621 A1 * | 8/2009 | Dotan | A23L 5/11 |
| | | | 99/348 |
| 2009/0223378 A1 | 9/2009 | Cretors | |
| 2009/0229473 A1 | 9/2009 | Vidojevic et al. | |
| 2010/0163548 A1 | 7/2010 | Cretors | |
| 2010/0170885 A1 | 7/2010 | Cretors | |
| 2011/0076372 A1 | 3/2011 | Cretors | |
| 2011/0076373 A1 * | 3/2011 | Cretors | A23P 30/38 |
| | | | 426/450 |
| 2011/0200727 A1 | 8/2011 | Biechteler | |
| 2012/0266756 A1 | 10/2012 | Cretors | |
| 2013/0224359 A1 | 8/2013 | Cretors | |
| 2013/0276640 A1 | 10/2013 | Cretors | |
| 2013/0276641 A1 | 10/2013 | Vidojevic | |
| 2013/0280386 A1 | 10/2013 | Cretors | |
| 2014/0234508 A1 | 8/2014 | Cretors | |
| 2015/0010679 A1 * | 1/2015 | Strong | A23L 5/15 |
| | | | 99/468 |
| 2015/0296824 A1 * | 10/2015 | Lindgren | A23C 19/06 |
| | | | 426/244 |
| 2015/0351421 A1 * | 12/2015 | Vetter | A23G 1/06 |
| | | | 99/330 |
| 2016/0192695 A1 * | 7/2016 | Bae | A23N 17/00 |
| | | | 99/324 |

\* cited by examiner

CONTINUOUS FLOW POPPER

RELATED APPLICATION

This application claims priority to and the benefit of U.S. Provisional Application No. 63/195,560, filed Jun. 1, 2021, which is incorporated herein by reference in its entirety.

TECHNICAL FIELD

This disclosure relates to grain poppers, more particularly to poppers that have a continuous flow.

BACKGROUND

Commercial grain poppers, that popcorn, quinoa, sorghum, rice, etc., poppers, typically operate in a one batch fashion. The user deposits the oil and grain in heated chamber and the either stands there and stirs the chamber while waiting for the grain to pop, or the chamber has some sort of movement mechanism that keeps the grain moving as it heats so it does not burn. Some air popper that do not use oil exist, but usually only in the consumer market.

For large batches of popped grain, this type of batch processing requires lots of labor. This raises costs. In addition, doing this on a batch basis takes time to produce high volumes of product. This further raises the costs as one needs to expand the number of chambers, and the number of workers.

DETAILED DESCRIPTION OF THE EMBODIMENTS

The embodiments involve a continuous flow popper to pop grain that can load grain and oil into a heating chamber, move the grain through the heating chamber to an outlet, and control the heat, all automatically.

Figure 1:
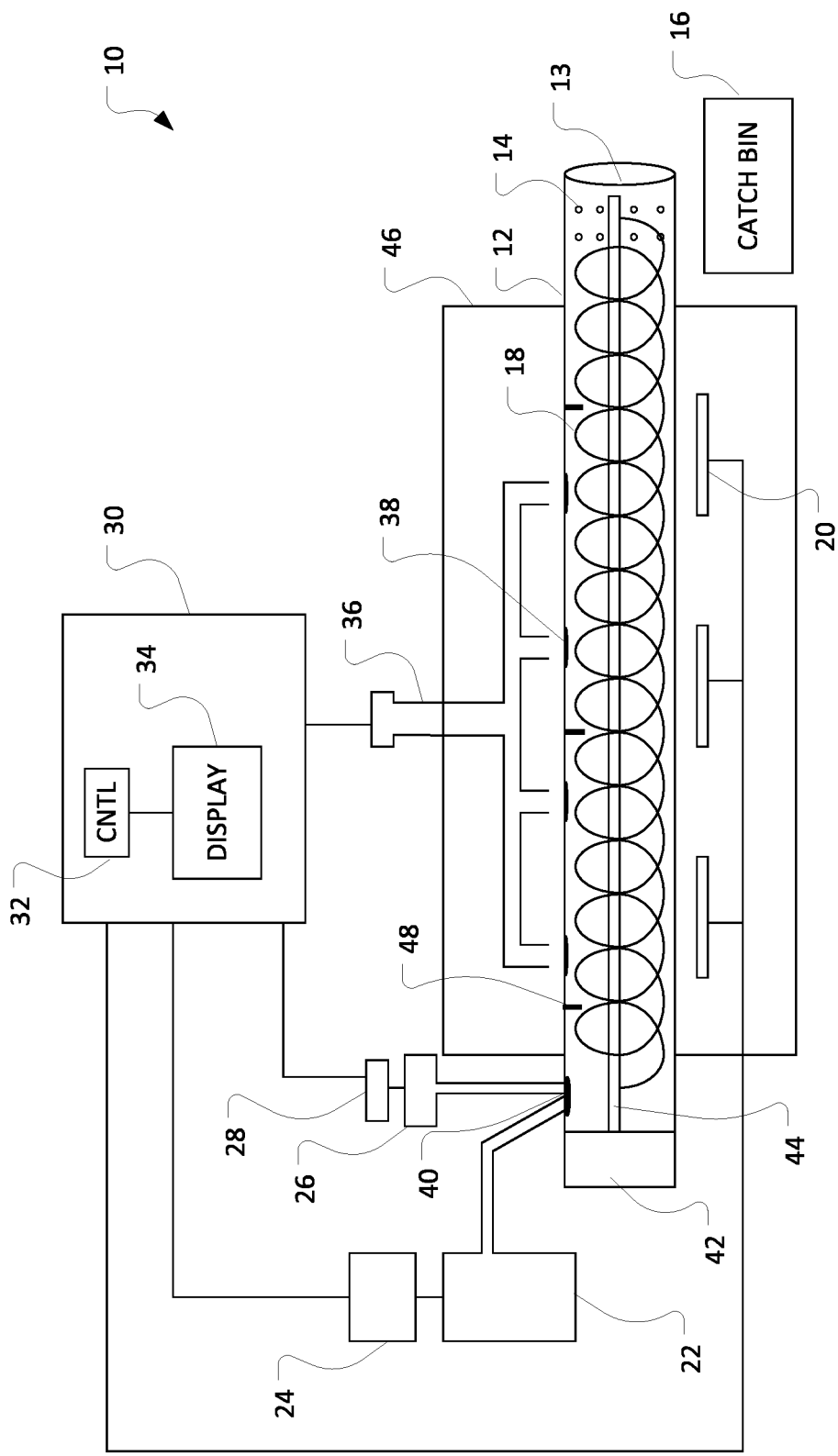
FIG. 1 shows an embodiment of a continuous flow popping system.

FIG. 1 shows an embodiment of a continuous flow popping system, or popper, 10. One should note that the specifics of this embodiment are for illustrative purposes only and no limitation to any specific example is intended, nor should it be implied.

The popping system in the embodiment has a long, tubular (or cylindrical) popping chamber 12. A grain moving component, in this embodiment, a spring 18, turns in the chamber 12 to move the grain from the inlet 40 through the heated chamber to the outlet 13 at the opposite end. In this embodiment, the popped grain exits a portion of the chamber body that extends past the oven, the portion having holes 14 to allow the grain to fall out of the chamber body and into the catch bin 16. However, in other embodiments, the grain may exit the popping chamber 12 through end of the chamber at 13. For purposes of this discussion here, the term "outlet" applied to any component of the system that allows the popped grain to exit the chamber.

The chamber body 12 houses the spring 18. The spring spins through the chamber, moving the grain towards the exit. A motor 42 is attached to a shaft 44 to which the spring is also attached. As the shaft spins, powered by the motor, the spring spin inside the chamber, pushing the grain to the exit. Other components to move the grain may exist and are included in the scope of the claims.

The heating chamber 46, also referred to as an oven, may comprise a single oven or multiple ovens connected together by the popping chamber. The heat source will be two or more heating elements, such as 20. Having more than one heating element allows for better control of the temperature in the popping chamber. The popping chamber may include sensors such as 48 located along the popping chamber length to monitor the temperature. The temperature readings from the sensors may allow the controller 30 to adjust operation of the heating elements such as 20 to ensure consistent heating at an appropriate temperature. While not shown here, the heating chamber 46 may include multiple, parallel popping chambers.

The grain may enter the popping chamber from a reservoir of grain 22, possibly under power of a pump 24. Alternatively, the popping chamber may be kept a negative pressure that causes the grain to flow inwards. Alternatively, the grain could be gravity fed from the reservoir. Similarly, the oil may enter the popping chamber from an oil reservoir 26, possibly provided motive force from a motor 28, or using the alternatives mentioned above with regard to the grain. The reservoirs of oil and grain allow the system to maintain the continuous flow, instead of the batch processing mentioned above. However, the chamber could be hand fed in a continuous manner as well, as long as the chamber has an access to allow the hand feeding during operation. This contrasts with batch processing, in which the user typically places the grain and oil in the popper before operating the popper. The scope of the claims does not require automated reservoirs for continuous popping.

In the embodiment shown, the system includes an exhaust 36 that has employs a vacuum to draw the smoke and steam out of the heating chamber through slits such as 38. This provides a cleaner process and assists in control of the heat in the chamber. The exhaust system may include a pump that creates the vacuum to remove the steam and smoke.

Using positively controlled, rather than passive, components for moving the grain and the oil into the popping chamber provides several advantages. The system has a central controller 30 that can monitor and control several different aspects of the process. This may include the speed of the shaft, and therefore the spring, in the chamber. It may also include the heat distribution in the chamber monitored from the sensor readings, the control of the heating elements in response to the sensor readings. The controller may also control the motors to control the rate grain and oil enter into the chamber 12.

Many variations and modifications exist and remain within the scope of this disclosure. For example, while the inlet for the grain and oil is shown here as a common inlet, they could be separate inlets. The motive components for the shaft, oil, grain, and the vacuum, may be stepper motors, worm drives, etc., any type of component that can generate power and provide a driving force may be used. The controller 30 may include a display 34 that is a touch screen as the user interface, or may have a control panel with knobs and buttons and other user input devices.

The controller component 32 may comprise a microcontroller, a general-purpose processor, an application specific integrated circuit (ASIC), a field programmable gate array (FPGA), etc. Controller 30 may include memory for storing programs to allow the user to select a pre-programmed set of temperatures, motor controls, etc., or for storing other information. The controller may allow storing of pre-programmed sets based upon amount of grain, type of grain, type of oil, etc. The system may have various sensors, not shown, similar to the temperature sensors. These may reside in the input bin 22 to indicate that the bin has a low level of grain, the oil source 26 to indicate that the oil level is low, and one for the catch bin 16 to let the user know it is full. The controller may communicate these through a message on the display screen, a siren or alarm, or a combination of both, such as an alarm, and then when the user checks the display, it has displayed the message.

All of the components that contact the grain and oil may comprise materials that can be cleaned and sanitized repeatedly without wear or damage, such as stainless steel. In addition, the spring may comprise a relatively heavy-duty spring compared to similar structures used in cooking and food service. In one embodiment, the popping chamber may be carbon steel.

In one embodiment, the spring may comprise a stainless steel spring having a wire thickness of at least 0.20 inches, and in one embodiment is of 0.22 inches. In one embodiment, the outside diameter of the spring may have a range of 3.0 inches to 4.0 inches, where the outside diameter is the diameter of the spring when it is in a 'resting' or unstretched state. In one embodiment, the outside diameter would have a range of 3.5 inches to 3.6 inches. In one embodiment, the spring has a number of turns in the range from 50-150 turns. These dimensions are generally for sorghum. The dimensions would more than likely vary for different grains. For one embodiment, if the grain were corn, for example, the popping chamber would be about a foot, or 12 inches, wide, and the spring would have to have a similar width to move the grain.

Figure 2:
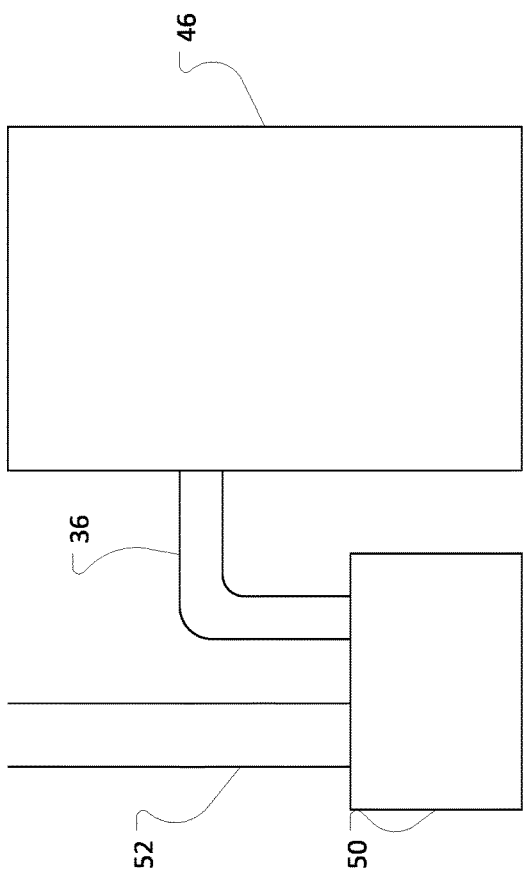
FIG. 2 shows an alternative embodiment of an exhaust configuration for a continuous flow popping system.

In addition, other variations and modifications exist. For example, the exhaust system exist the popping chamber through any of the surfaces. In FIG. 1, it exits through the top. The exhaust may also exit through either end of the oven exterior, the front, or back. may include a plenum, sometimes referred to as an "air handling box," that can also capture the drippings of oil that the exhaust air flow may include. FIG. 2 shows a side view of the oven 46 with the exhaust 36 exiting the oven. The exhaust will typically comprise hot gas with entrained oil. The plenum 50 then receives the exhaust and can capture the oil drippings in the gas. The gas can then exit the plenum through the outtake hose or conduit 52.

The continuous popping aspect of the popper depends upon a means of moving the grain through the popping chamber in a manner that prevents the grain from sticking in any one location. This would cause the grain to pop and then burn or scorch. As discussed above, in one embodiment, the grain moving component comprises a spring attached to a shaft. As the shaft spins, the wire of the spring moves the grain through the chamber. The inventor has discovered that attaching exterior wires to the spring causes a more effective way to stir the grain as it heats. This leads to more consistent popping and better heat distribution through the grain.

Figure 3:
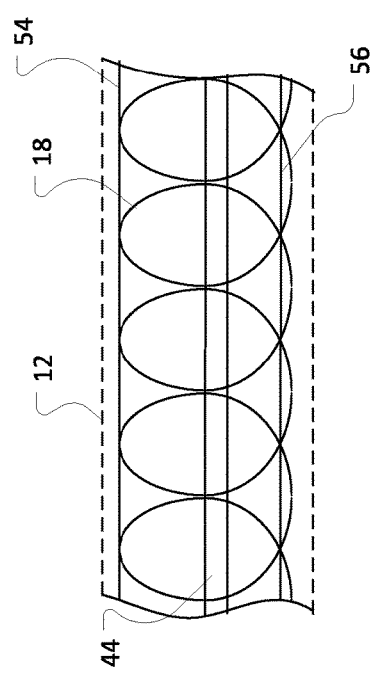
FIG. 3 shows an alternative embodiment of a grain moving component.

FIG. 3 shows a portion of the popping chamber 12, shown in dashed lines. The spring 18 rotates with the shaft 44 because the spring attaches to the shaft at either end as shown in FIG. 1. In the embodiment of FIG. 3, two wires 54 and 56 connect to the "outsides" of the spring loops, causing the wires to move with the spring around the interior walls of the popping chamber. This assists with stirring and moving the grain.

Figure 4:
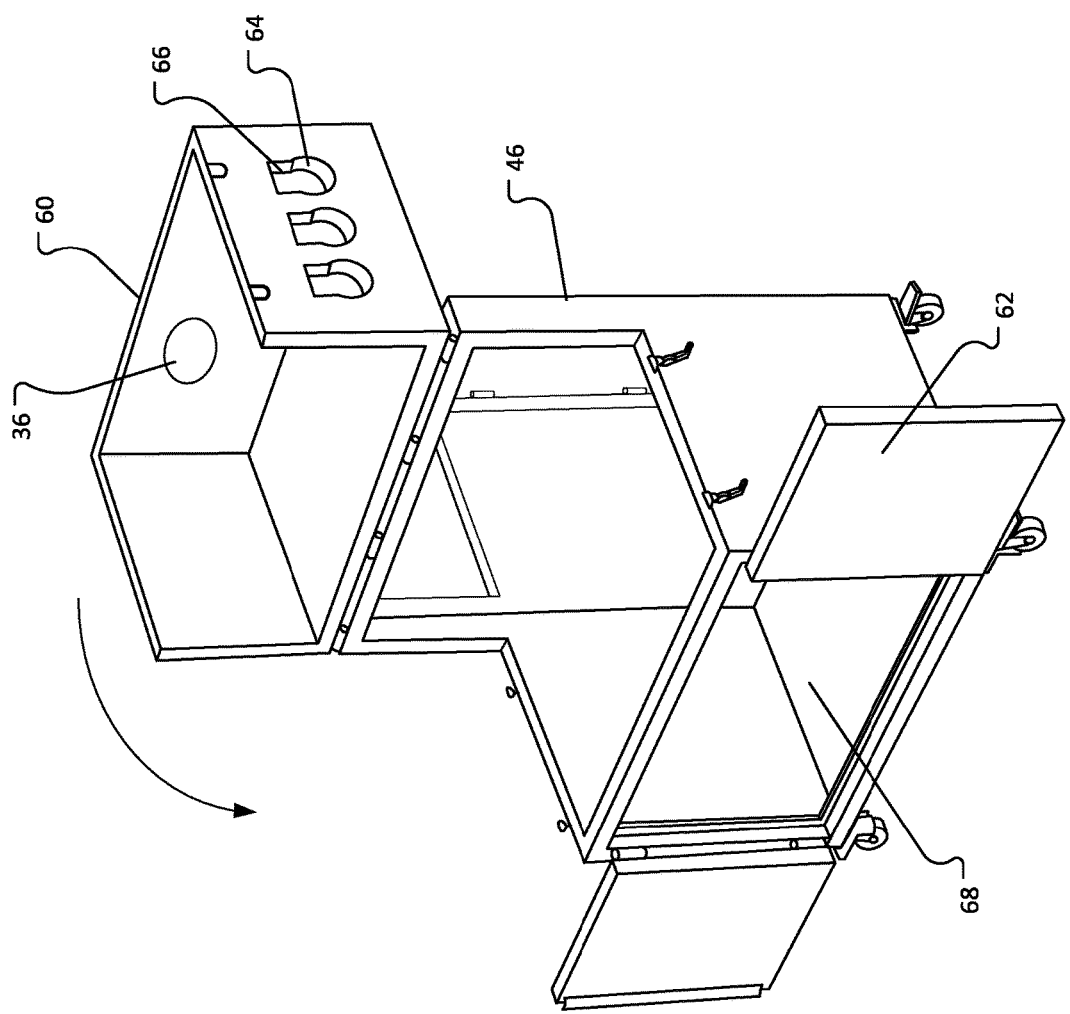
FIG. 4 shows an embodiment of a chamber.

Another modification involves uses a hinged over/heating chamber. Shown in simplified form in FIG. 4, the heating chamber 46 has a lid 60 that can be unlocked and lifted. The lid would come down in the direction of the arrow to close the chamber. Opening this lid in this manner allows access to the various components of the continuous flow popper, including heating elements, sensors, etc. The holes for the outlet are not shown here, but would be as shown in FIG. 1. As one can see by the holes such as 64, this embodiment allows for 3 parallel popping chambers, with slot underneath 66 for the heating elements. This allows for even higher capacity. The exhaust 36 would be on the front of the chamber with the lid closed.

The opposite side from the side with the holes will typically also have holes. The popping chambers, such as 12 from FIG. 1, will extend beyond the edges of the oven chamber. At one end, it allows the chamber to be connected with the oil and grain reservoirs, and at the other end, it allows the now-popped grain to exit the chambers. The open doors on the recess 68 that has a shelf, show the area in which other components, such as a high-voltage supply, and the power connections for the pumps, fans, and motors, may reside, if used.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art, which are also intended to be encompassed by the embodiments.

What is claimed is:

1. A continuous flow grain popping system, comprising:
   a heating chamber;
   one or more popping chambers at least partially inside the heating chamber, each popping chamber having an inlet and an outlet;
   each popping chamber having a grain moving component configured to move the grain from the inlet to the outlet, the grain moving component comprising a spring attached to a shaft; and
   one more heating elements adjacent the one or more popping chambers positioned to add heat to the one or more popping chambers as the grain moving component moves the grain from the inlet to the outlet of each popping chamber.

2. The continuous flow grain popping system as claimed in claim 1, wherein the spring further has wires connected to on opposite sides.

3. The continuous flow grain popping system as claimed in claim 1, further comprising one or more heat sensors located in the heating chamber to sense a temperature.

4. The continuous flow grain popping system as claimed in claim 1, further comprising an oil reservoir connected to each of the one or more popping chambers at the inlet.

5. The continuous flow grain popping system as claimed in claim 4, further comprising an oil sensor connected to the oil reservoir positioned to sense an amount of oil in the oil reservoir.

6. The continuous flow grain popping system as claimed in claim 4, further comprising one of a motor to move the oil into popping chamber, or a pump to hold the popping chamber at a negative pressure to cause the oil to flow into the popping chamber.

7. The continuous flow grain popping system as claimed in claim 4, wherein the oil reservoir is positioned to allow the oil to be gravity fed into the popping chamber.

8. The continuous flow grain popping system as claimed in claim 1, further comprising a grain reservoir connected to each of the one or more popping chambers at the inlet.

9. The continuous flow grain popping system as claimed in claim 8, further comprising a grain sensor connected to the grain reservoir configured to sense an amount of grain in the grain reservoir.

10. The continuous flow grain popping system as claimed in claim 8, further comprising one of a motor to move the oil into the one or more popping chamber, or a pump to hold the popping chamber at a negative pressure to cause the oil to flow into the one or more popping chamber.

11. The continuous flow grain popping system as claimed in claim 8, wherein the oil reservoir is positioned to allow the oil to be gravity fed into the one or more popping chamber.

12. The continuous flow grain popping system as claimed in claim 1, further comprising a controller to control a speed of the grain moving component, and to receive input from any sensors and to control components of the system in response to the inputs.

13. The continuous flow grain popping system as claimed in claim 12, further comprising a display connected to the controller to provide information to the user.

14. The continuous flow grain popping system as claimed in claim 12, wherein the any sensors comprises at least one of a heat sensor, a sensor in an oil reservoir, and a sensor in a grain reservoir.

15. The continuous flow grain popping system as claimed in claim 12, wherein the components include the one or more heating elements, and at least one of a pump or a motor.

16. A continuous flow grain popping system, comprising:
a heating chamber;
one or more popping chambers at least partially inside the heating chamber, each popping chamber having an inlet and an outlet;
each popping chamber having a grain moving component configured to move the grain from the inlet to the outlet;
one more heating elements adjacent the one or more popping chambers positioned to add heat to the one or more popping chambers as the grain moving component moves the grain from the inlet to the outlet of each popping chamber;
an oil reservoir connected to each of the one or more popping chambers at the inlet; and
a grain reservoir connected to each of the one or more popping chambers at the inlet.

17. The continuous flow grain popping system as claimed in claim 16, further comprising a controller to control a speed of the grain moving component, and to receive input from any sensors and to control components of the system in response to the inputs.

18. The continuous flow grain popping system as claimed in claim 16, further comprising a display connected to the controller to provide information to a user.

19. The continuous flow grain popping system as claimed in claim 16, wherein the any sensors comprises at least one of a heat sensor, a sensor in the oil reservoir, and a sensor in the grain reservoir.

* * * * *